(12) United States Patent
Beutin et al.

(10) Patent No.: US 7,430,852 B2
(45) Date of Patent: Oct. 7, 2008

(54) TURBOJET HAVING A LARGE BYPASS RATIO

(75) Inventors: Bruno Beutin, Evry (FR); Nelson Dos Santos, Creteil (FR); Jeremy Fert, Paris (FR); Fabienne Lacorre, Vaux le Penil (FR); Jean-Louis Picard, Vaux le Penil (FR)

(73) Assignee: SNECMA, Paris (FR)

( * ) Notice: Subject to any disclaimer, the term of this patent is extended or adjusted under 35 U.S.C. 154(b) by 543 days.

(21) Appl. No.: 11/042,052

(22) Filed: Jan. 26, 2005

(65) Prior Publication Data
US 2005/0172609 A1 Aug. 11, 2005

(30) Foreign Application Priority Data
Feb. 5, 2004 (FR) .................... 04 01083

(51) Int. Cl.
*F02K 3/02* (2006.01)
(52) U.S. Cl. .................... 60/226.1; 239/265.39; 60/770
(58) Field of Classification Search ................ 60/226.1, 60/262, 770; 239/265.39
See application file for complete search history.

(56) References Cited

U.S. PATENT DOCUMENTS

| 4,471,609 A | 9/1984 | McLaren |
| 4,683,717 A | 8/1987 | Naud |
| 4,785,625 A | 11/1988 | Steel et al. |
| 5,056,307 A * | 10/1991 | Liang ..................... 60/226.1 |
| 5,275,357 A | 1/1994 | Seelen et al. |
| 5,592,813 A * | 1/1997 | Webb ..................... 60/226.2 |
| 5,791,138 A * | 8/1998 | Lillibridge et al. ............ 60/262 |
| 5,943,856 A * | 8/1999 | Lillibridge et al. ............ 60/262 |
| 6,223,524 B1 * | 5/2001 | Durcan ..................... 60/226.1 |
| 6,666,018 B2 * | 12/2003 | Butler et al. ................ 60/226.1 |
| 6,990,797 B2 * | 1/2006 | Venkataramani et al. ...... 60/204 |
| 7,047,725 B2 * | 5/2006 | Moe et al. ..................... 60/262 |
| 7,100,869 B2 * | 9/2006 | Picard et al. .................. 244/54 |
| 7,140,174 B2 * | 11/2006 | Johnson ..................... 60/226.1 |
| 7,188,467 B2 * | 3/2007 | Johnson ..................... 60/226.1 |
| 7,216,475 B2 * | 5/2007 | Johnson ..................... 60/226.1 |
| 7,246,481 B2 * | 7/2007 | Gutmark et al. ................ 60/204 |
| 2005/0081509 A1 * | 4/2005 | Johnson ..................... 60/226.1 |
| 2007/0144141 A1 * | 6/2007 | Roberge et al. ............. 60/226.1 |
| 2007/0186535 A1 * | 8/2007 | Powell et al. ............... 60/226.1 |

FOREIGN PATENT DOCUMENTS

FR 2625261 6/1989

* cited by examiner

*Primary Examiner*—William H Rodríguez
(74) *Attorney, Agent, or Firm*—Oblon, Spivak, McClelland, Maier & Neustadt, P.C.

(57) ABSTRACT

A turbojet comprises at least a fan, a compressor, a combustion chamber, a turbine, and a rigid substantially-cylindrical jacket fastened at its upstream end to an intermediate casing and at its downstream end to an exhaust casing, the jacket serving to transmit forces between the intermediate casing and the exhaust casing.

15 Claims, 3 Drawing Sheets

TURBOJET HAVING A LARGE BYPASS RATIO

The invention relates to a turbojet, in particular a turbojet having a large bypass ratio, the turbojet comprising at least one compressor, a combustion chamber, a turbine, and a fan mounted upstream from the compressor and rotated by the turbine, and means downstream from the fan defining an annular space for a bypass flow to flow around the casings of the compressor, the combustion chamber, and the turbine, which bypass flow adds to the combustion gas of the main flow in order to increase thrust.

BACKGROUND OF THE INVENTION

The turbojets of modern civil airplanes are characterized by a large bypass ratio, i.e. a ratio of bypass flow divided by main flow that is greater than 5, and that may be as great as 9 or 10. This leads to a reduction in the transverse dimensions of the body of the turbojet between the fan and the turbine (the "wasp waist" effect), and this reduction in transverse dimensions leads to a reduction in the bending strength of said body.

Bending deformations of the turbojet body in turn lead to deformations of the casing around the rotor, with the casing ovalizing, which reduces the clearance between the casing and the rotor at some locations while increasing the clearance at other locations (the "casing distortion" effect).

OBJECTS AND SUMMARY OF THE INVENTION

A particular object of the present invention is to provide a solution that is simple, effective, and inexpensive to these problems of the wasp waist effect and of the casing distortion effect in turbojets, and in particular in turbojets having a large bypass ratio.

To this end, the invention provides a turbojet comprising at least one compressor, a combustion chamber, a turbine, and a fan mounted upstream from the compressor and rotated by the turbine, and means downstream from the fan defining an annular space for a bypass flow to flow around the casings of the compressor, the combustion chamber, and the turbine, wherein said means comprise a stationary substantially-cylindrical jacket surrounding the casings of the compressor, the combustion chamber, and the turbine, and defining a substantially-cylindrical inner surface for guiding the bypass flow, the jacket being made as a single rigid piece and being fastened at its upstream end to a structural casing, e.g. an intermediate casing, and at its downstream end to an exhaust casing, and serving to transmit forces between the intermediate casing and the exhaust casing.

This jacket, which surrounds the body of the turbojet at a distance therefrom and which stiffens it, opposes bending deformation of the turbojet body and forms a structure for transmitting forces between the front and rear portions of the turbojet body.

Making it as a single piece serves to increase its stiffness, thereby reducing bending deformation of the turbojet body.

Advantageously, the downstream end of said jacket is fastened to the exhaust casing by means that leave it with at least one degree of freedom corresponding to the thermal expansion of the turbojet body in operation.

In a particularly simple embodiment, the ends of said jacket are fastened by being bolted to the intermediate casing and to the exhaust casing.

This method of fastening is simple and inexpensive and allows the jacket to be removed, should that be necessary.

Because of the stiffness of the jacket and because it is fastened to the intermediate and the exhaust casings, it is possible to omit the thrust take-up bars that are generally fitted to turbojets.

In addition, doors are provided in the jacket to give access to equipment located inside the jacket, such as, in particular: fuel injectors, variable-pitch vane control rings, and an accessory driving gearbox.

According to another characteristic of the invention, the downstream portion of the jacket includes hinged flaps and means for moving the flaps between a rest position in which they lie in line with the jacket, and an in-service position in which they project from said jacket and form obstacles to the bypass flow, the means for moving the flaps comprising actuators mounted on said jacket and acting on the flaps or on a control ring for the flaps.

This characteristic of the invention presents a particular advantage when the operability of the turbojet makes it necessary to increase the in-flight idling speed during the descent and approach stages of the airplane. This increase in speed increases the thrust from the turbojet which becomes too high. The flaps provided on the jacket serve to spoil the thrust delivered by the secondary flow during the descent and approach stages, thereby bringing the total thrust down to an appropriate level.

It then becomes possible in a high bypass ratio turbojet to envisage eliminating the conventional thrust reversal system.

BRIEF DESCRIPTION OF THE DRAWINGS

Other advantages and characteristics of the invention appear on reading the following description given by way of non-limiting example and with reference to the accompanying drawings, in which.

MORE DETAILED DESCRIPTION

Figure 1:
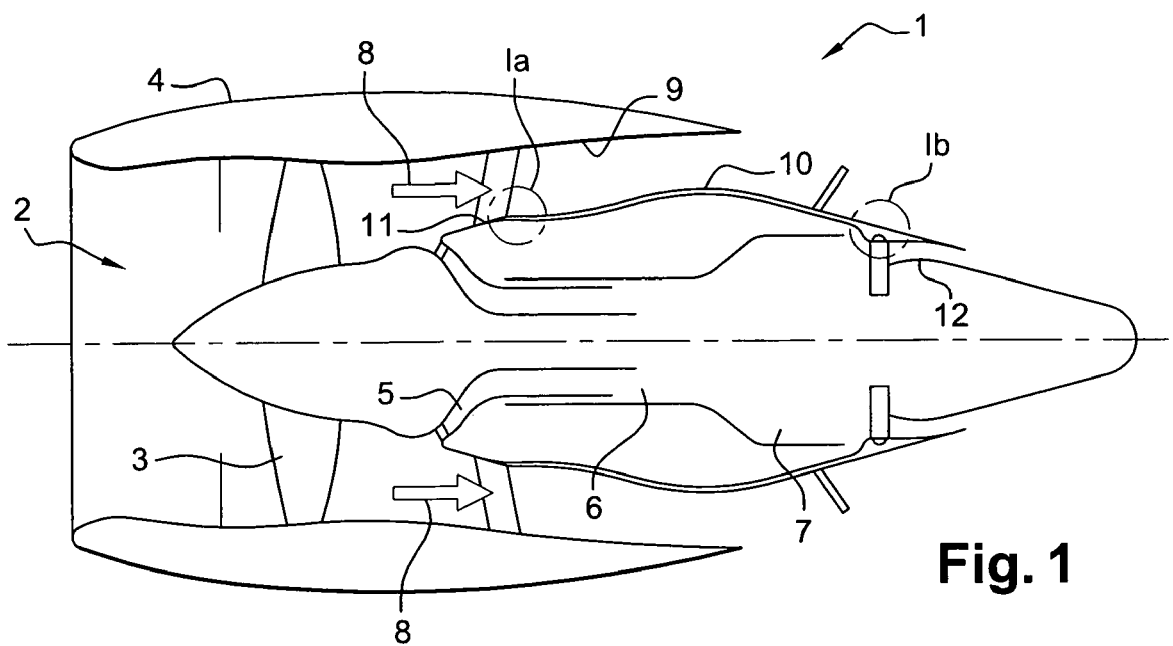
FIG. 1 is a highly diagrammatic axial section view of a large bypass ratio turbojet of the invention.

FIG. 1 is a highly diagrammatic view of a bypass turbojet 1 having, at its front end, a fan 2 comprising a wheel 3 that revolves inside a shroud 4. The flow of air sucked in by the fan 2 is split downstream from the fan into a main flow which passes through an engine comprising a compressor 5, an annular combustion chamber 6, and a turbine 7, and a bypass flow which flows around the engine as shown by arrows 8 and which provides additional thrust over and above the thrust provided by the combustion gas exhausted from the turbine 7.

The path for the bypass flow 8 is defined on its outside by the inside wall 9 of the shroud, and on its inside by a jacket 10 of substantially cylindrical shape that surrounds the engine and that extends from a structural casing, such as an intermediate casing 11, to an exhaust casing 12 at the outlet from the turbine. The intermediate casing 11 is rigidly connected by radial arms to the fan shroud.

According to the invention, the jacket 10 is rigid and fastened at its upstream and downstream ends to the body of the engine in order to stiffen it and avoid bending deformation and the casing distortion effect.

Increasing the bypass ratio of a turbojet, i.e. increasing the ratio of bypass flow divided by main flow leads to a reduction in the cross-section of the engine between the compressor and the turbine (the "wasp waist" effect), with this reduction in section encouraging distortion of the casing, as mentioned above. By fastening the rigid jacket 10 at its end to the body of the engine, bending deformation of the body is avoided even when the bypass ratio is large, e.g. when it lies in the range 5 to 10.

Figure 1A:
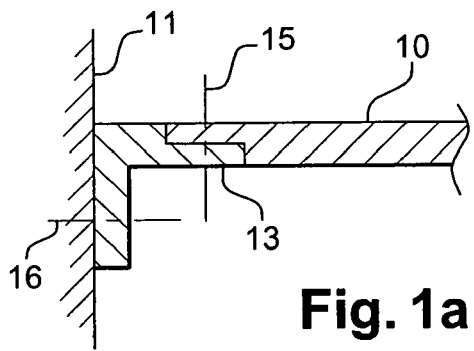
FIGS. 1a and 1b are enlarged views of details Ia and Ib in FIG. 1.
Figure 1B:
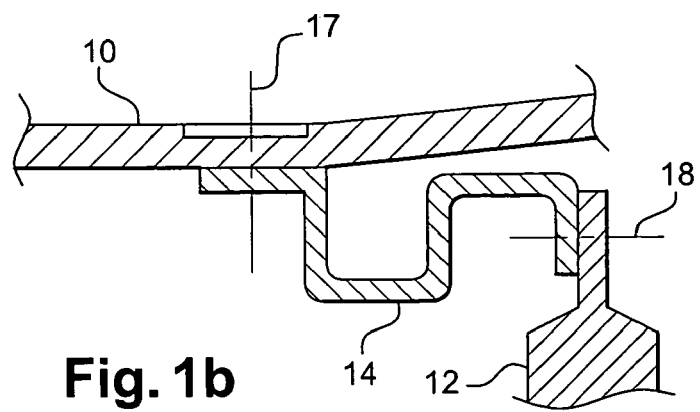

The jacket 10 is made as a single piece. As can be seen more clearly in FIGS. 1a and 1b, the jacket 10 is fastened at its upstream end by means of an annular flange 13 to the intermediate casing 11, and at its downstream end via a support part 14 to the exhaust casing 12, at the level where the engine is fastened to the pylon for mounting it under the wing of the airplane. The fastenings are preferably made by means of bolts 15, 16, 17, 18. The fastening between the downstream end of the jacket 10 and the exhaust casing 12 is designed to retain at least one degree of freedom corresponding to the thermal expansion of the engine in operation. To give a degree of axial freedom to the jacket 10, the configuration of the support part 14 enables it to deform elastically in the axial direction.

The section of the jacket 10 increases from its upstream end to its middle portion situated level with the rear end of the shroud 4, and then decreases to its downstream end, with the general shape of the jacket being bi-conical.

Figure 2:
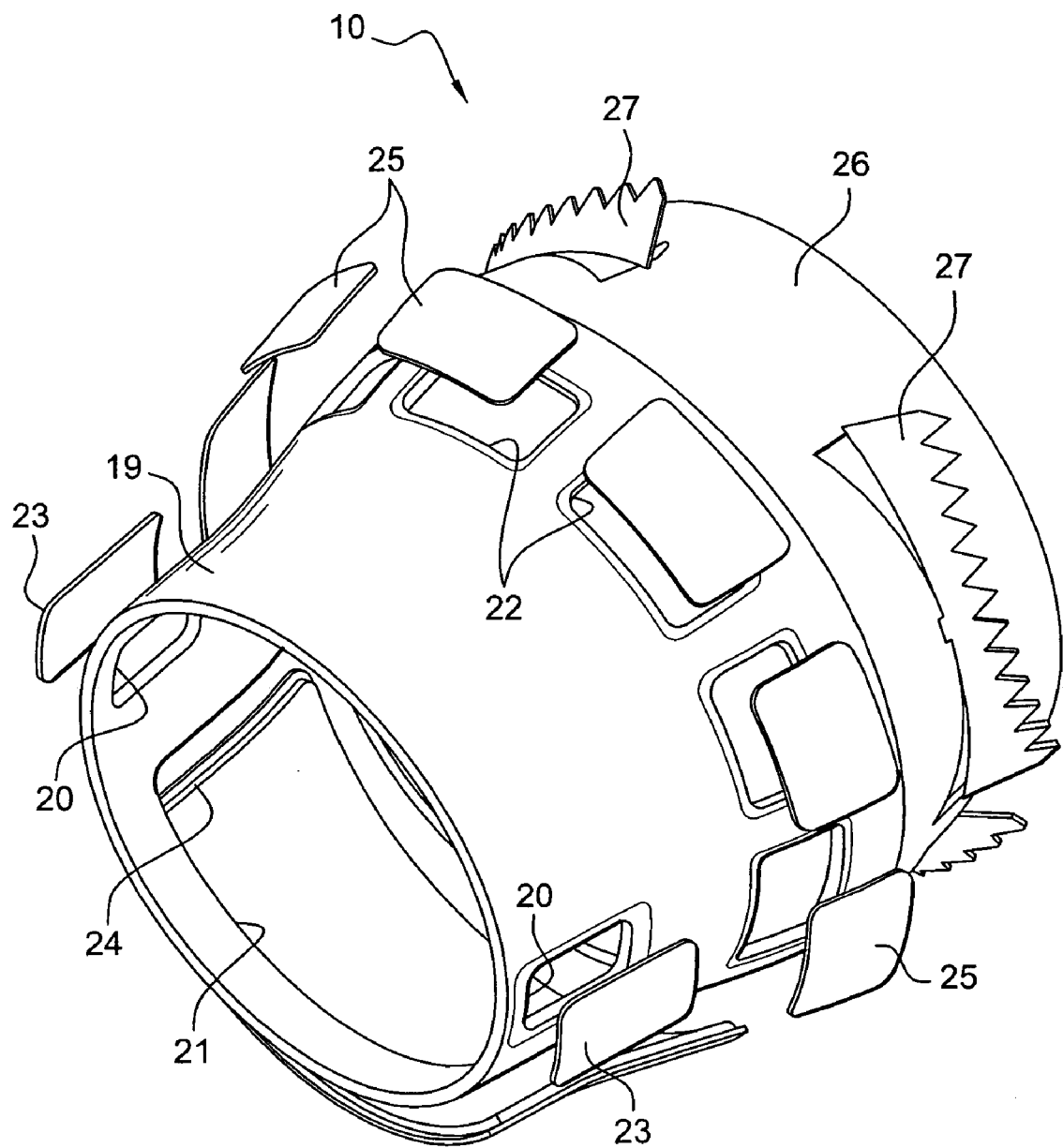
FIG. 2 is a diagrammatic perspective view of the jacket of the turbojet.

As shown in FIG. 2, the upstream portion 19 of the jacket 10 has orifices giving access to equipment that is to be found inside the jacket, and in particular orifices 10 giving access to rings for controlling variable-pitch vanes that are to be found on a casing of the compressor 5, an orifice 21 giving access to an accessory-control gearbox, and orifices 22 giving access to fuel injectors in the combustion chamber.

The access orifices 20, 21, and 22 are closable by respective removable doors or panels 23, 24, and 25 that are fastened to the jacket 10 by any suitable means, e.g. by screws.

Figure 3:
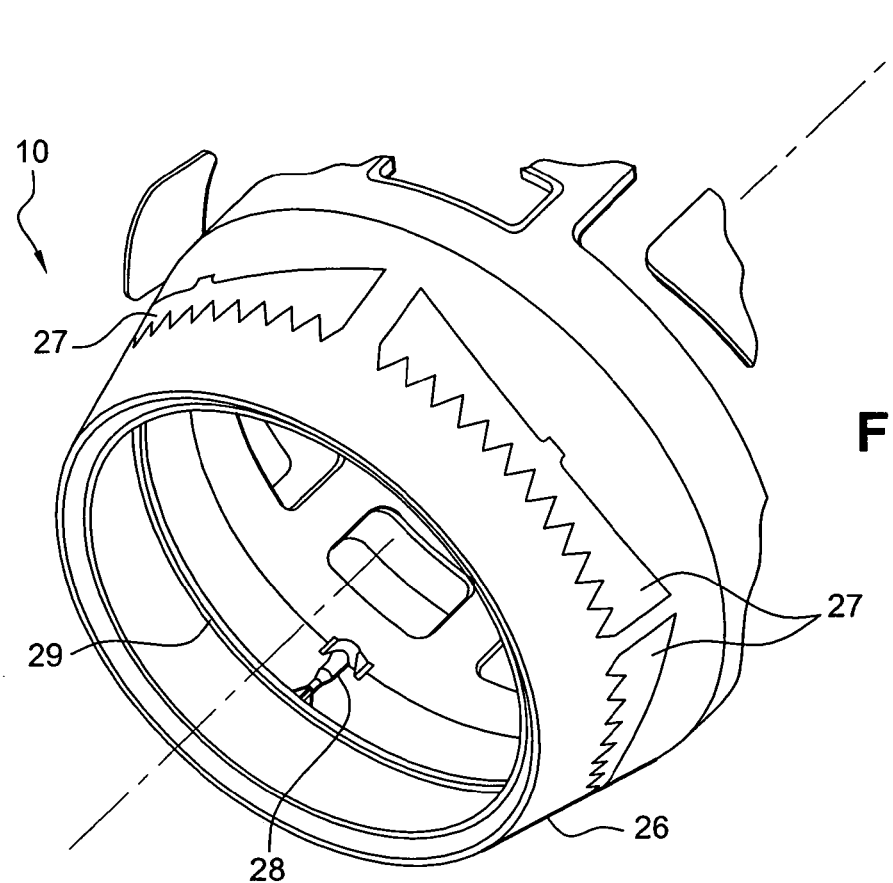
FIG. 3 is a diagrammatic perspective view of the downstream portion of the FIG. 2 jacket, showing the means for displacing the hinged flaps.

The downstream portion 26 of the jacket 10, i.e. the portion downstream from the throat of the bypass flow nozzle 8, has hinged flaps or panels 27 in a circumferential disposition capable of pivoting about transverse axes that are tangential to a circumference of the jacket 10 between a position as shown in FIG. 2 where they project outwards from the jacket 10 and a retracted or rest position in which they lie in the surface of the jacket 10, as shown in FIG. 3.

In the extended position, the flaps or panels 27 obstruct the downstream movement of the bypass flow 8 and spoil the thrust delivered by the fan 2. This is advantageous when the operability of the turbojet does not make it possible for engine speed to be reduced sufficiently during the descent and approach stages. This makes it possible to conserve sufficient engine speed while reducing thrust.

The flaps or panels 27 may be of saw-tooth shape in order to reduce noise.

Figure 4:
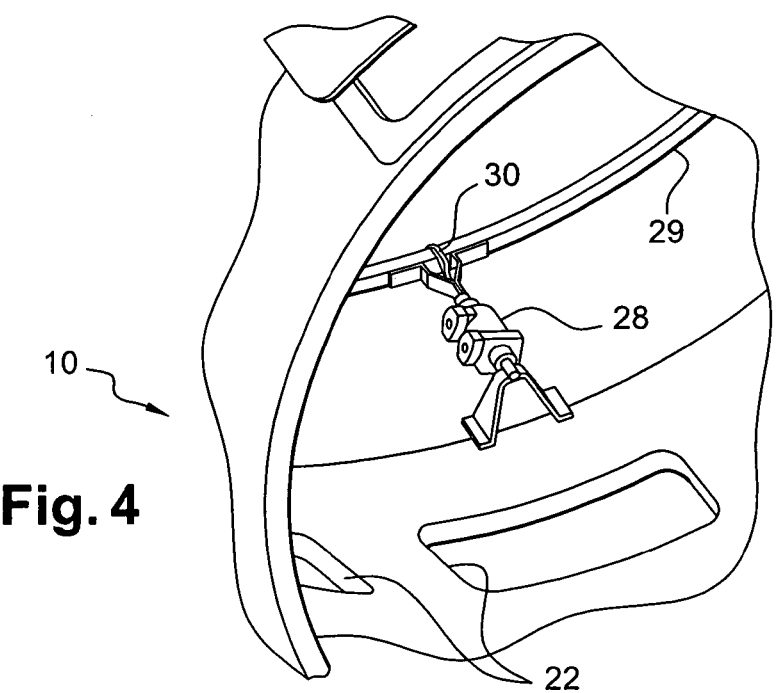
FIG. 4 is an enlarged diagrammatic view of the means shown in FIG. 3 for moving the flaps.

They are actuated by small actuators 28, either directly or via a control ring 29, as shown in FIGS. 3 and 4.

In these figures, the ring 29 for controlling the flaps or panels 27 is mounted inside the downstream portion 26 of the jacket 10 and is moved by means of an actuator 28 whose cylinder is carried by the jacket 10 and whose piston rod acts on the ring 29 which is connected via links 30 to the flaps or panels 27.

This system of flaps or panels 27 makes it possible in a high bypass ratio engine to eliminate the reverse thrust means that are usually provided in engines of this type. This results in a reduction in the number of parts and in cost.

What is claimed is:

1. A turbojet comprising a body having at least one compressor, a combustion chamber and a turbine, and a fan mounted upstream from the body and rotated by the turbine for producing a bypass flow to flow around the body, wherein a stationary substantially-cylindrical jacket surrounds the body and defines a substantially-cylindrical inner surface for guiding the bypass flow, the jacket being made as a single rigid piece and being fastened at its upstream end to an intermediate casing of the body and at its downstream end to an exhaust casing of the body for transmitting forces in operation between the intermediate casing and the exhaust casings, wherein said body has a wasp waist defined by a reduction in a transverse dimension of said body between said fan and said turbine so that said turbojet has a bypass ratio greater than 5, said bypass ratio being a ratio of said bypass flow to a main flow through said compressor.

2. A turbojet according to claim 1, wherein the downstream end of said jacket is fastened to the exhaust casing by a fastener which is elastically deformable in an axial direction during thermal expansion of the turbojet in operation.

3. A turbojet according to claim 1, wherein the ends of said jacket are fastened to the intermediate casing and to the exhaust casing by bolts.

4. A turbojet according to claim 1, wherein said jacket includes access doors giving access to equipment located inside the jacket.

5. A turbojet according to claim 1, wherein said jacket includes, in its downstream portion, hinged flaps and actuators configured to move the flaps between a rest position in which they lie in line with the jacket, and an in-service position in which they project from said jacket and form obstacles to the bypass flow.

6. A turbojet according to claim 5, wherein the actuators are mounted on said jacket and act on the flaps or on a control ring for the flaps.

7. A turbojet according to claim 1, wherein said stationary substantially-cylindrical jacket surrounds said wasp waist.

8. A turbojet according to claim 1, wherein said fan comprises a wheel that revolves inside a shroud, and said bypass flow follows a path defined on its outside by an inside wall of said shroud, and on its inside by said stationary substantially-cylindrical jacket.

9. A turbojet according to claim 8, wherein said stationary substantially-cylindrical jacket surrounds said wasp waist and extends downstream beyond said shroud.

10. A turbojet according to claim 9, wherein said stationary substantially-cylindrical jacket is configured and connected to said intermediate and exhaust casings so as to reduce a bending deformation of said body caused by said wasp waist.

11. A turbojet according to claim 9, wherein said stationary substantially-cylindrical jacket has an upstream section over said wasp waist that increases in diameter away from said upstream end, and a downstream section that extends downstream beyond said shroud and that decreases in diameter toward said downstream end.

12. A turbojet according to claim 9, wherein said stationary substantially-cylindrical jacket has a bi-conical shape.

13. A turbojet according to claim 8, wherein said stationary substantially-cylindrical jacket defines with said shroud an annular space for said bypass flow.

14. A turbojet comprising a body having at least one compressor, a combustion chamber and a turbine, and a fan mounted upstream from the body and rotated by the turbine for producing a bypass flow to flow around the body, wherein a stationary substantially-cylindrical jacket surrounds the body and defines a substantially-cylindrical inner surface for guiding the bypass flow, the jacket being made as a single rigid piece and being fastened at its upstream end to an intermediate casing of the body and at its downstream end to an exhaust casing of the body for transmitting forces in operation between the intermediate casing and the exhaust casing, wherein said jacket includes, in its downstream portion, hinged flaps and actuators configured to move the flaps between a rest position in which they lie in line with the jacket, and an in-service position in which they project from said jacket and form obstacles to the bypass flow.

15. A turbojet according to claim 14, wherein the actuators are mounted on said jacket and act on the flaps or on a control ring for the flaps.

* * * * *